(12) United States Patent
Fischer

(10) Patent No.: US 7,784,325 B2
(45) Date of Patent: Aug. 31, 2010

(54) CALIBRATION STANDARD

(76) Inventor: Helmut Fischer, Im Eichli 20, CH-5315 Oberägeri (CH)

( * ) Notice: Subject to any disclaimer, the term of this patent is extended or adjusted under 35 U.S.C. 154(b) by 695 days.

(21) Appl. No.: 11/599,600

(22) Filed: Nov. 14, 2006

(65) Prior Publication Data

US 2007/0119229 A1    May 31, 2007

(30) Foreign Application Priority Data

Nov. 14, 2005   (DE) .................. 10 2005 054 589

(51) Int. Cl.
*G01B 3/30* (2006.01)
(52) U.S. Cl. ...................................................... 73/1.81
(58) Field of Classification Search ................. 73/1.79, 73/1.81, 1.89
See application file for complete search history.

(56) References Cited

U.S. PATENT DOCUMENTS

| | | | |
|---|---|---|---|
| 4,425,545 A | 1/1984 | Scalese | |
| 4,738,131 A * | 4/1988 | Euverard | 73/1.81 |
| 4,963,826 A | 10/1990 | Capobianco et al. | |
| 6,014,886 A * | 1/2000 | Anderson et al. | 73/1.81 |
| 6,529,014 B1 * | 3/2003 | Nix | 324/662 |

FOREIGN PATENT DOCUMENTS

| | | |
|---|---|---|
| EP | 1 087 228 A2 | 3/2001 |
| JP | 6-313709 | * 11/1994 |

* cited by examiner

*Primary Examiner*—Robert R Raevis
(74) *Attorney, Agent, or Firm*—Kriegsman & Kriegsman

(57) ABSTRACT

The invention relates to a calibration standard, especially for the calibration of devices for the non-destructive measurement of the thickness of thin layers with a carrier plate (16) of a basic material and a standard (17) applied on the carrier plate (16), said standard having the thickness of the layer at which the device is to be calibrated, wherein that a holding device (22) arranged on the basic body (12) of the calibration standard (11) receives at least the standard (17) to the basic body (12) such that upon setting a measuring probe of the device for the non-destructive measurement of thin layers onto the standard (17), its position will be changeable by at least one degree of freedom.

12 Claims, 4 Drawing Sheets

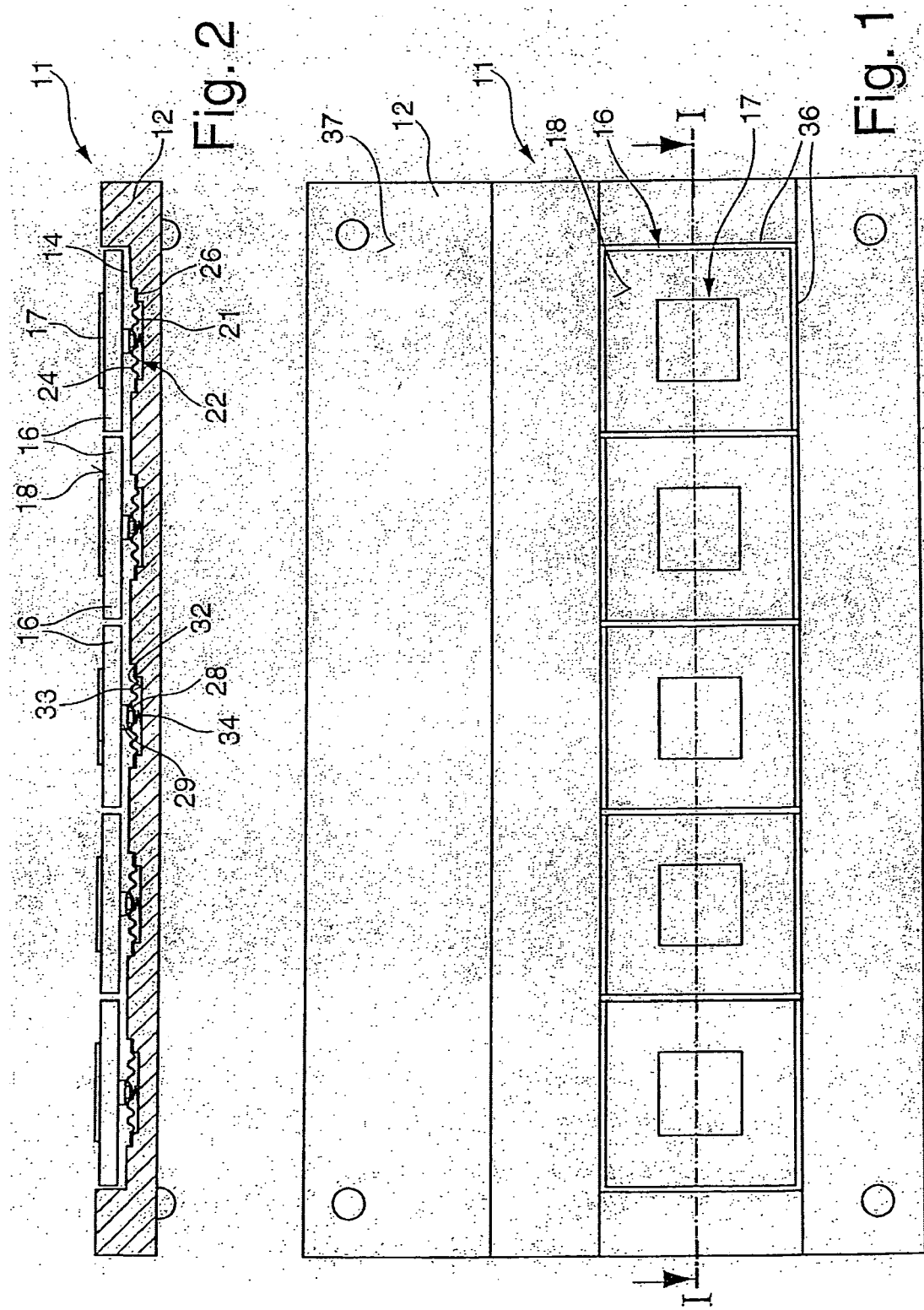

CALIBRATION STANDARD

Figure 3:
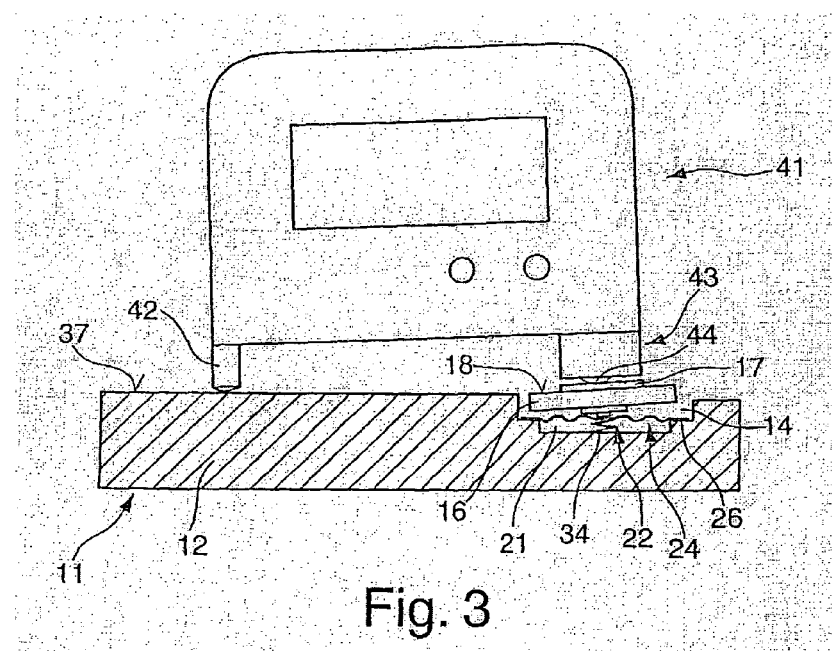

This invention relates to a calibration standard, especially for the calibration of devices for the non-destructive measurement of the thickness of thin layers with a carrier plate of a basic material and a standard applied on the carrier plate, said standard having the thickness of the layers to be measured at which the device is to be calibrated.

For the non-destructive measurement of the thickness of thin layers by a magnetic induction method or an eddy current method depending on the basic material and/or the coating, it is necessary that—after a standardization—the devices are calibrated for the corresponding measurement. By means of the calibration, a difference between the nominal value and the measured actual value is established. This difference will be corrected, with the device being calibrated to the measuring task.

Calibration is provided such that, to start with, a first value is registered on a basic material by means of a measuring probe of the measuring device. Following that, another value is registered on a standard which is applied on the carrier plate measured before. The difference will be the measured layer thickness. Due to the standard, the nominal value to be measured is determined. After several measurements, the averaged deviation between nominal and actual values will be registered and calibrated. The calibration standards known so far consist of a carrier plate of the basic material—of steel and iron for the magnetic induction method for measuring the layer thickness, and of a non-ferromagnetic basic material, for example non-magnetic steel, aluminum and their alloy, for the layer thickness measurement by means of the eddy current method. The surfaces of the carrier plate are preferably polished. On this carrier plate, a standard is applied or glued, for example as a plastic film. These calibration standards are problematic in so far as build-ups can result already due to the application or the gluing. To avoid these disadvantages, DE 10 2005 028 652.6 proposed to apply the standard by means of plating by rubbing on the carrier plate to avoid the build-ups. In this case, the standard is produced in a preferred embodiment as an insulation layer, especially as a semiconductor material. This calibration standard has already proven successful in application.

On the basis of this calibration standard, the invention is based on the objective of increasing the precision of calibration to obtain a better measuring precision of the calibrated measuring devices.

This problem is solved by a calibration standard for the calibration of devices for the non-destructive measurement of the thickness of thin layers with a carrier plate of a basic material and a standard applied on the carrier plate, said standard having the thickness of the layer at which the device is to be calibrated, wherein that a holding device arranged on the basic body of the calibration standard receives at least the standard to the basic body such that upon setting a measuring probe of the device for the non-destructive measurement of thin layers onto the standard, its position will be changeable by at least one degree of freedom. Further advantageous embodiments and developments are indicated in the other claims.

When setting a measuring probe of the device for the measurement of thin layers, the standard changeable in its position by at least one degree of freedom will enable that a tilt-free setting is provided of the measuring probe or, respectively, of a contact spherical cap with a sensor element of the measuring probe assigned to it. Due to this standard changeable from its rest position during the registration of a plurality of actual values for the calibration of the device, it is rendered possible that the measuring probe is always set on in the same position, even if the measuring probe is entirely lifted up from the calibration standard and subsequently set on again. Due to the standard changeable in its position, a kind of wobble arrangement of the standard to the basic body of the calibrating standard is given, thereby enabling the tilt-free arrangement to the measuring probe and thus considerably minimizing the occurrence of errors.

According to an advantageous embodiment of the invention, it is provided that the standard is positioned twist-proof—about an axis perpendicular to the surface of the standard—from the holding device to the basic body. This will enable that—upon setting the measuring probe outside of a center axis of the standard—a defined, especially wobbling deflection movement without twisting is provided. The alignment of the standard to the basic body will be maintained which enables identical measuring conditions for every measurement and thus for registering the actual values. Due to the twist-proof reception, an additional rotation of the standard—for tilting or deflecting the standard from the rest position—will be prevented so that unique conditions are provided upon calibration.

According to a preferred embodiment, the holding device features at least one spring-loaded resilient holding element which provides, especially in its center axis, a bearing surface for the central reception of the standard or the carrier plate with a standard provided thereon. Due to this holding element, an at least minor deflection from the rest position can be provided immediately upon setting a measuring probe onto the standard so that a tilt-free measurement will be rendered possible. Especially in the calibration of a manual measuring device by the user, different forces applied can thereby be balanced so as to avoid minutest damages of the surface of the standard and/or of the contact spherical cap.

According to a preferred embodiment, the holding element of the holding device is designed as a disk shaped diaphragm. Such a disk shaped diaphragm is designed with a very thin wall thickness so that this diaphragm is spring-loaded resilient in design. For example, the diaphragm can be made spring hard of a copper/beryllium alloy, of nickel, aluminum or the like. The diaphragm can preferably feature elevations or depressions radially arranged to the center axis which determine the bending, as well as the bending force or the reset force, respectively.

According to an alternative embodiment of the holding device, it is provided that the holding element is designed as a spring disk with circular segment shaped punchings. Such a spring disk has the same properties as a disk shaped diaphragm. The holding element is preferably fastened in a depression on the basic body. This depression is used quasi as a clearance for a deflection movement of the holding element. The depression is preferably designed with a circumferential shoulder in which the holding element rests for simple alignment and positioning.

According to another advantageous embodiment of the invention, it is provided that the holding device comprises at least one damping or spring element which is propped on the bottom of the depression and engages on an underside of the holding element. Such a damping or spring element can additionally provide a power of resistance while a measuring probe is set onto the standard. When using such a damping or spring element, the holding element designed as a disk shaped diaphragm or spring disk can be soft in design. This will have the advantage that a soft deflection of the standard will be enabled whereby the measurement of the actual values will be increased and, accordingly, the calibration can be performed more precisely.

A preferred embodiment provides for the carrier plate being provided in a reception of the basic body and the surface of the carrier plate lying in a rest position on the level of the surface of the basic body. The surface of the basic body thereby forms a bearing surface on which an auxiliary pole of a manual measuring device can be set to initially make a first measurement on the carrier plate on the same level. In the reception of the basic body, the depression for the arrangement of the holding element of the holding device will also be preferably provided.

Furthermore, a narrow circumferential gap is preferably designed between the reception of the basic body and the carrier plate. Due to the narrow circumferential air gap, the surface of the carrier plate—changeable from the rest position by at least one degree of freedom—and thus also the measuring surface of the standard to the adjacent basic body will have the effect of a continuous material so that the radial field of force lines can be designed quasi continuously without any impairment had in comparison with an uninterrupted surface.

Preferably, the calibration standard is designed with a plurality of standards of different layer thicknesses which are applied on the carrier plates. Here, the carrier plates are preferably arranged in a row next to each other, separated by a narrow gap. This gap width is preferably also provided between the carrier plate and the basic body so that identical conditions exist. Thus, a calibration standard can be designed for a plurality of layer thicknesses by means of a basic body, with all layer thicknesses having the same conditions.

Preferably, a calibration standard with a plurality of normal, different layer thicknesses will be structured such that the carrier plate which accepts the standard with the largest thickness will be arranged in the center of the basic body, and the other carrier plates each accepting a standard being arranged with descending thickness of the standard, at an increasing distance from the standard with the largest thickness. Thus can be ensured that—for registering the maximum thickness of the standard—a large radial field of force will be available to enable exact registering of the actual value.

The calibrating standard according to the invention can be designed as a so-called precision standard which enables a tilt-free setting of the measuring probe of a device for the non-destructive measurement of the thickness of thin layers onto the standard, with always the same conditions being provided upon setting a measuring probe onto the standard.

Figure 4:
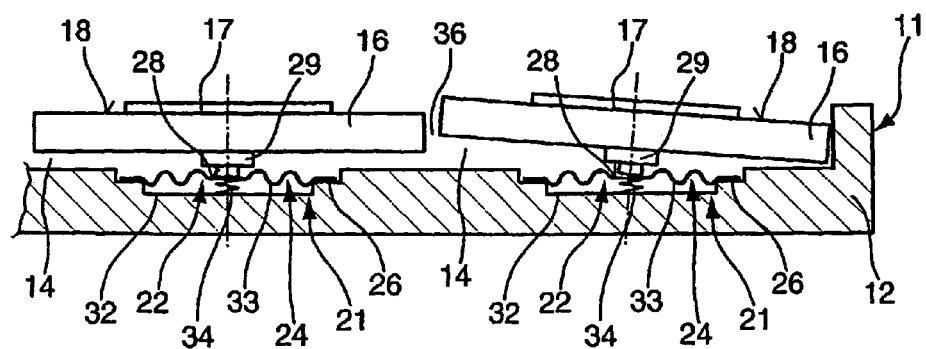
Figure 5:
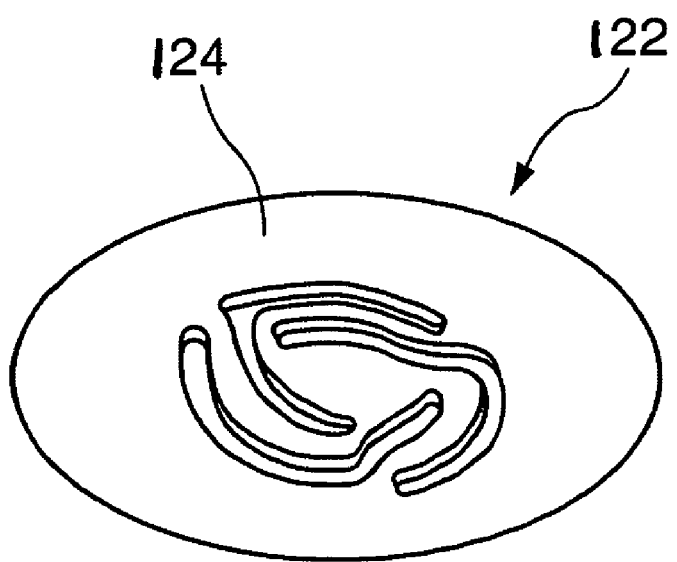
Figure 6:
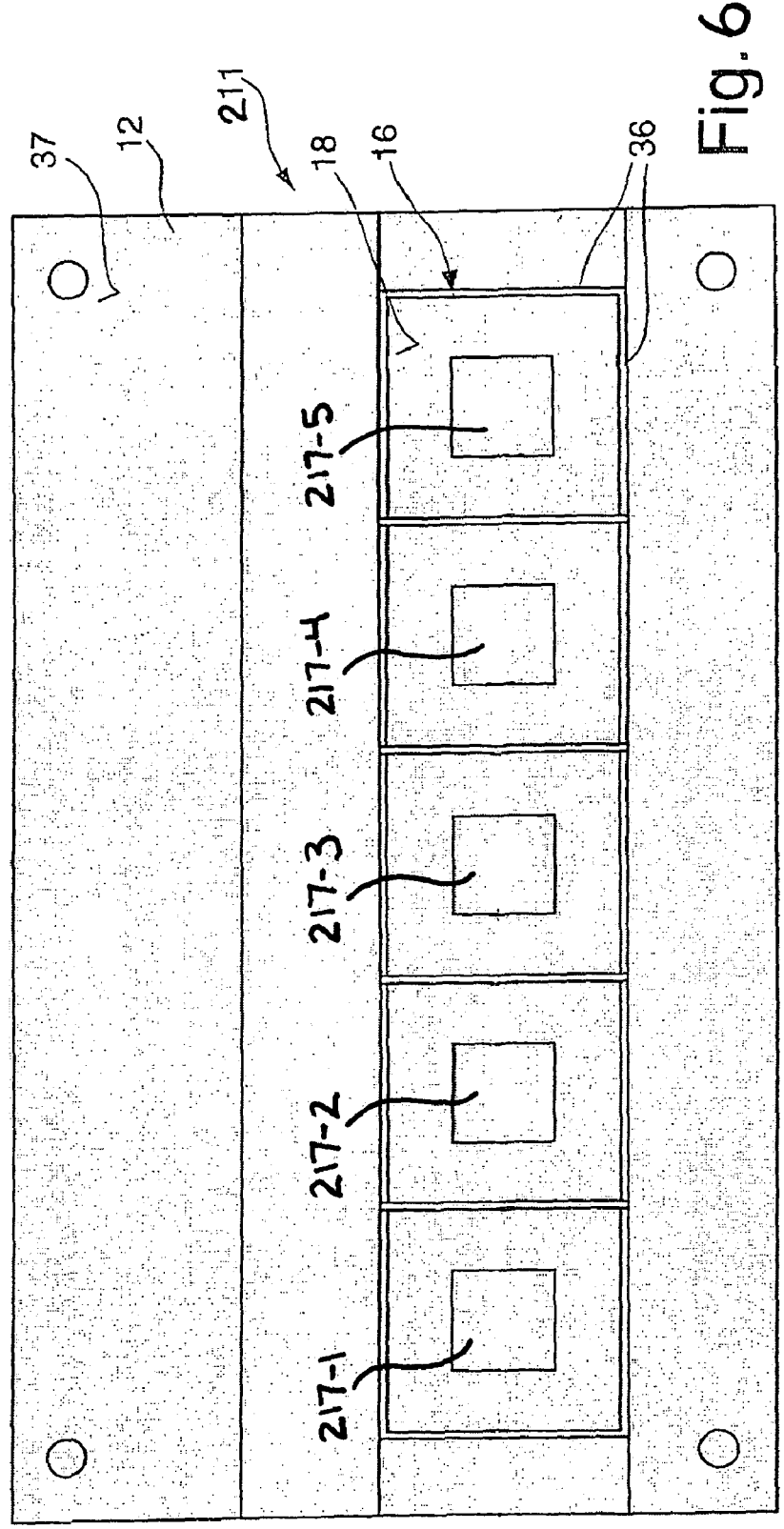

In the following, the invention as well as additional advantageous embodiments and developments of the same will be explained and described in detail on the basis of the examples presented in the drawings. The features which can be gathered from the description and the drawings can be used individually by themselves or in a plurality in any combination according to the invention. In the Figures:

FIG. 1 shows a diagrammatic top view of a calibration standard according to the invention;

FIG. 2 a diagrammatic sectional view along line I-I in FIG. 1 of the calibration standard according to the invention;

FIG. 3 a diagrammatic view during the calibration of a manual measuring device for measuring the thickness of thin layer;

FIG. 4 an enlarged partial view of the sectional view in FIG. 2;

FIG. 5 a holding device comprising a holding element designed as a spring disk with circular segment punchings; and FIG. 6 shows a diagrammatic top view of an alternate embodiment of a calibration standard according to the invention.

FIG. 1 shows a diagrammatic top view of the calibration standard 11 according to the invention. FIG. 2 shows a diagrammatic sectional view along line I-I in FIG. 1. The calibration standard 11 comprises a basic body 12 which comprises a reception 14 for at least one carrier plate 16 on which a standard 17 is applied with a defined thickness.

The standard 17 comprises an upper side and an underside which are polished plane-parallel, especially polished brightly. The standard 17 is fastened by means of plating by rubbing on a measuring surface 18 of the carrier plate 16 which is polished in the same manner as the standard 17. Due to the effect of the Coulomb forces, cold welding will thus develop between the standard 17 and the carrier plate 16. Additionally, in the transition area or, respectively, the marginal area of the standard 17 to the measuring surface 18 of the carrier plate 16, a groove will be formed to protect this marginal area against corrosion. Accordingly, this groove only has a sealing effect. The standard 17 can be provided in layer thicknesses of up to 1,000 □m. According to a preferred embodiment, the standard 17 is manufactured as an insulation layer, especially of a semiconductor material, such as silicon or germanium for example.

Depressions 21 are provided in the reception 14 of the basic body 12. Allocated to these depressions 21, holding devices 22 are provided which each carry the carrier plate 16. The holding device 22 consists of a spring-loaded resilient holding element 24 which extends over the depression 21 and rests on a shoulder 26 limiting the depression 21. This shoulder 26 is used for the positionally true positioning of the holding element 24. For example, the holding element 24 is provided as a disk shaped diaphragm. This disk shaped diaphragm has, in its center axis, a bearing surface 28 which is intended to receive a connecting piece 29 which carries the carrier plate 16. Opposite the connecting piece 29, on the underside of the holding element 24, a damping or spring element 34 is preferably provided which is propped on the bottom 32 of the depression 21. This damping or spring element 34 can be designed as a spiral spring, as a rubber elastic element or the like. The holding element 24 designed as a disk shaped diaphragm comprises elevations and/or depressions 33 between a bearing section on shoulder 26 and a bearing surface 28. Depending on the thickness of the diaphragm, the material of the diaphragm as well as the developments of the elevations or depressions 33, the spring force of the diaphragm as well as the spring excursion can be determined. The holding element 24 is preferably held on the shoulder 26 by means of gluing or soldering.

The above described arrangement of a standard 11 on the carrier plate 16 which is taken up to the basic body 12 by means of the holding device 22 can form a calibration standard 11 which accordingly only consists of a standard 17. Alternatively, a plurality of standards 17 can be arranged lying side by side as is evident from the exemplary embodiment according to FIGS. 1 and 2. The carrier plate 16 is designed, for example, with a square base area. This has the advantage that a uniform gap 36 is made possible between the carrier plate 16 and the basic body 12, as well as between the carrier plates 16 adjacent to each other.

Due to the arrangement according to the invention of the standard 17 or, respectively, of the carrier plate 16 with the standard 17 provided thereon towards the basic body 12, it will be enabled that the standard 17 is arranged twist-proof towards the basic body, yet being resiliently movable in its longitudinal center axis or respectively, along the surface standard versus the standard 17, and also being held, by the disk shaped diaphragm, in a wobble deflection twist-proof to the reception 14. This ensures at the same time that, upon tilting from a rest position, any canting with an adjacent wall section of the basic body 12 or the carrier plate 16 will be prevented. At the same time, the effect will be achieved that the air gap 36 does not cause any interruption of the radial lines of force of a sensor element of the measuring probe, thus achieving a high measuring precision.

Adjacent to the carrier plate 16, a bearing surface 37 is provided on the basic body 12, said surface preferably lying on the same level to the bearing surface or, respectively, measuring surface 18 of the carrier plate 16. Such a bearing surface 37 is designed as an auxiliary pole to set manual measuring devices thereon and subsequently set, via a tilting movement of the manual measuring device, a measuring probe on the standard 17.

FIG. 3 shows such an example of use. A manual measuring device 41 is set, with a setting foot 42, onto a bearing surface 37. Following that, a swivel movement is made whereby a measuring probe 43 is moved towards the standard 17. In the example of use, a contact spherical cap 44 of the measuring probe 43 is set outside of a center axis of the standard 17. A change of position of the standard 17 from the rest position is effected thereby. Due to the wobble reception of the standard 17 via the holding device 22 to the basic body 12, it will be made possible that an off-center setting can be balanced out by a deflection movement of the standard 17 so that the standard 17 is aligned in a tilt-free position to the measuring probe 43. The measuring error resulting due to the tilting can thus be eliminated by means of the wobble arrangement of the standard 17. A defined deflection of the standard 17 will be ensured due to the twist-proof reception of the standard 17 via the holding device 22 to the basic body.

FIG. 4 is an enlarged view of a calibration standard 11 according to FIG. 2. The left illustration shows the carrier plate 16 in a rest position. The right illustration shows the carrier plate 16 in a maximum deflected position which is limited by the reception 14 or, respectively, by the gap 36 between the carrier plate 16 and the reception 14. Alternatively, the holding device 22 can also be designed for a limitation of the deflection movement.

Such calibration standards 11 can also be used for handheld measuring probes which are connected via a signal line with a device for the non-destructive measurement of the thickness of thin layers. Also, the calibration standards 11 are provided for measuring devices which are held, for example, movably up and down on a tripod.

An alternative embodiment of a calibration standard 11 shown in FIG. 1 can consist in one of the carrier plates 16—without a standard 17 applied thereon—being inserted into the reception 14 of the basic body 12. This carrier plate 16 comprises a measuring surface 18 which is used as a reference surface and is identically aligned to the additional measuring surfaces 18 of the additional carrier plate 16. Such a carrier plate 16 without standard 17 is preferably arranged in the marginal area of the reception 14. The carrier plate 16 without standard 17 is preferably equivalent to the size of the other carrier plates 16 provided in the reception 14. Alternatively, a carrier plate 16 can also be provided which is smaller with regard to the surface but is received in a wobbling manner like the other carrier plates 16.

FIG. 5 shows an alternative embodiment of a holding device 122, holding device 122 comprising a holding element 124 with circular segment punchings.

FIG. 6 shows a diagrammatic top view of an alternate embodiment of a calibration standard 211 according to the invention. Calibration standard 211 is similar in most respects to standard 11, the principal difference between the two calibration standards being that calibration standard 211 includes a plurality of standards 217-1 through 217-5, with the standard with the largest thickness, namely, standard 217-3, being arranged in the center of the reception of the basic body and the other standards 217-1, 217-2, 217-4 and 217-5 being arranged in descending thicknesses from standard 217-3.

All of the above mentioned features are, each separately, essential for the invention and can be randomly combined with each other.

What is claimed is:

1. Calibration standard for the calibration of devices for the non-destructive measurement of the thickness of thin layers having a carrier plate of a basic material and a standard applied on the carrier plate, said standard having the thickness of the layer at which the device for the non-destructive measurement of thin layers is to be calibrated, said calibration standard further having a holding device for receiving and positioning the carrier plate with the thereon applied standard to a basic body such that upon setting a measuring probe of the device for the non-destructive measurement of thin layers onto the standard, a position of the standard will be changeable by at least one degree of freedom, wherein the holding device comprises at least one spring-loaded resilient holding element which provides in a central axis of the spring-loaded resilient holding element a bearing surface for a central receiving of the carrier plate with the standard positioned thereon.

2. Calibration standard according to claim 1, wherein the carrier plate with the standard positioned thereon is received by the holding device in a twist-proof manner about an axis perpendicular to the surface of the standard.

3. Calibration standard according to claim 1, wherein the holding element is designed as a disk shaped diaphragm.

4. Calibration standard according to claim 1, wherein the holding element is designed as a spring disk with circular segment punchings.

5. Calibration standard according to claim 1, wherein the holding device is arranged between the standard and the basic body.

6. Calibration standard according to claim 1, wherein the holding element is allocated to a depression in the basic body.

7. Calibration standard according to claim 6, wherein the holding device comprises at least one further damping or spring element which is propped on the bottom of the depression and engages on an underside of the holding element.

8. Calibration standard according to claim 7, wherein the damping or spring element is arranged in the center axis of the holding element.

9. Calibration standard according to claim 1, wherein the carrier plate is provided in a reception of the basic body and that the surface of the carrier plate in a rest position of the standard lies on the level of the surface of the basic body.

10. Calibration standard according to claim 9, wherein a narrow circumferential gap is provided between the reception of the basic body and the carrier plate.

11. Calibration standard according to claim 1, wherein a plurality of carrier plates is provided in a row next to each other with one standard each in the basic body and that a narrow gap is provided between the carrier plates allocated to each other.

12. Calibration standard according to claim 1, wherein—with a plurality of standards each on one carrier plate and taken up by the basic body—the standard with the largest thickness will be arranged in the center of the reception of the basic body and the other standards will be arranged with descending thickness at an increasing distance from the standard with the largest thickness.

* * * * *